United States Patent [19]

Baker

[11] 3,977,303

[45] Aug. 31, 1976

[54] ENGINES AND COMPRESSORS

[75] Inventor: Archibald John Stephen Baker, Childrey, near Wantage, England

[73] Assignee: Exxon Research and Engineering Company, Linden, N.J.

[22] Filed: Nov. 25, 1974

[21] Appl. No.: 526,457

Related U.S. Application Data

[63] Continuation-in-part of Ser. No. 240,394, April 3, 1972, abandoned.

[52] U.S. Cl. ................................ 91/493; 123/44 D; 74/44

[51] Int. Cl.$^2$ .................... F01B 13/06; F16H 21/22; F02B 57/00

[58] Field of Search .................. 91/493, 491; 92/72, 92/73; 417/273; 123/44 D; 74/44, 49

[56] References Cited

UNITED STATES PATENTS

| | | | |
|---|---|---|---|
| 973,739 | 10/1910 | Aluergnat | 417/273 |
| 2,472,647 | 6/1949 | Lovins | 74/49 |
| 2,683,422 | 7/1954 | Richards, Jr. | 91/493 |
| 2,831,438 | 4/1958 | Guinard | 91/493 |
| 2,936,632 | 5/1960 | Dalmer | 74/49 |
| 3,195,420 | 7/1965 | Johnnsen | 74/49 |
| 3,258,992 | 5/1966 | Hittell | 74/49 |
| 3,410,477 | 11/1968 | Hartley | 417/534 |
| 3,431,865 | 3/1969 | Coon et al. | 417/273 |
| 3,685,923 | 8/1972 | Hutchins | 417/273 |

*Primary Examiner*—William L. Freeh
*Attorney, Agent, or Firm*—D. F. Wholers

[57] ABSTRACT

A piston and cylinder machine for use as a prime mover, pump or compressor in which there are at least two pairs of pistons and cylinders for each crankpin, the cylinders of each pair being disposed on opposite sides of the crankpin and rigidly connected to each other by a yoke. For each cylinder pair, there is rotatably and eccentrically mounted on the crankpin a disc rotatably received in a respective yoke and whose eccentricity relative to the crankpin is equal to that of the crankpin relative to the crankshaft whereby the piston stroke is twice the crankpin throw. The discs are integral with each other within their superimposed peripheries so that a short, stiff crankpin may be used, and they are out of phase by twice the angular separation of the pairs of cylinders. No phasing gears are provided between the discs and the crankcase and/or crankshaft, and side forces on the pistons are reacted against the cylinder walls through the provision of a springy, thin hard metal wear shim lubricated by a wedge of lubricant trapped between the wear shim and cylinder walls. All secondary out-of-balance forces are eliminated. The regulation of fluid into and out of each cylinder is by a rotary valve the sealing forces of which are regulatable and depend on the cylinder pressures.

17 Claims, 18 Drawing Figures

FIG.1.
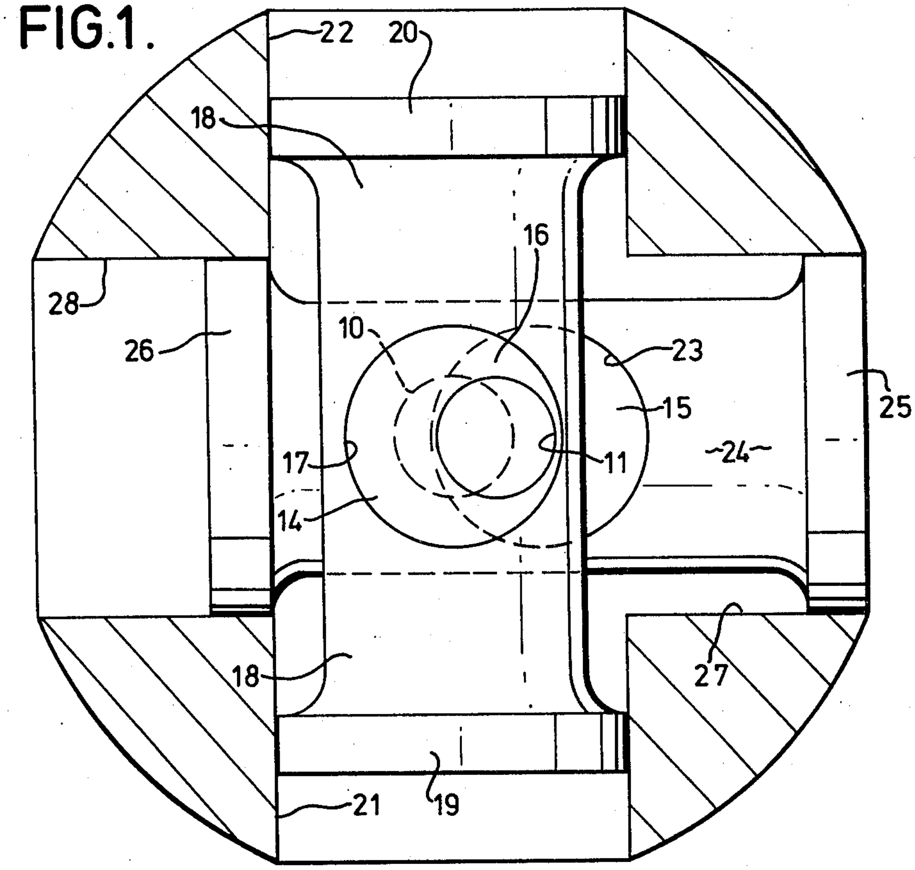
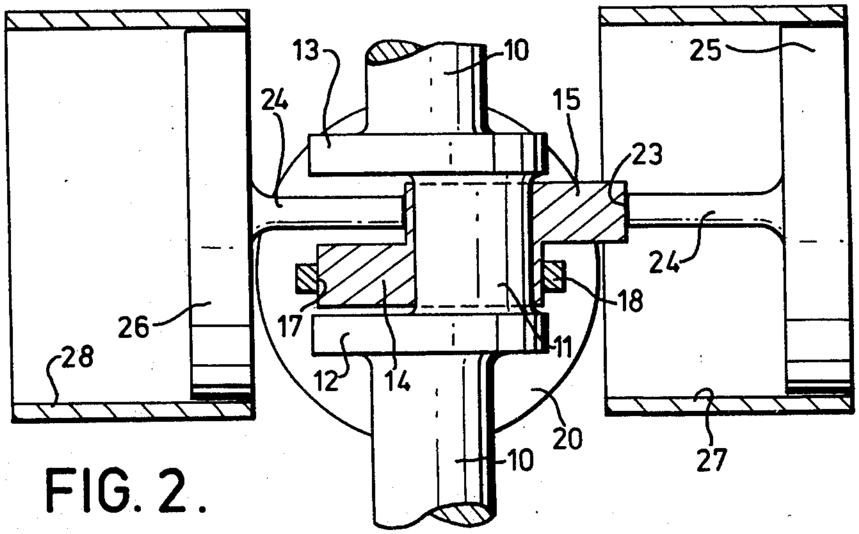
FIG. 2.

ENGINES AND COMPRESSORS

CROSS-REFERENCE TO RELATED APPLICATION

This application is a continuation-in-part of applicant's prior application Ser. No. 240,394, filed Apr. 3, 1972, and now abandoned and relates to engines, motors and pumps, hereinafter referred to as "machines" for brevity, in which fluid is passed to the machine at one pressure and fluid is passed out of the machine at another pressure, the change in fluid pressure being reflected in power generated or used by the machine.

Machines have previously been proposed in which a crankpin of a crankshaft is eccentrically received in a disc received in an aperture of a yoke or rod to the opposite ends of which pistons are attached for reciprocating movement in cylinders. The eccentricity of the axis of the disc relative to the crankpin axis is equal to the eccentricity of the latter relative to the crankshaft axis. Such machines are unworkable since when the crankshaft has been turned (e.g. by gas forces acting on the piston) until the piston has completed 90° of its stroke from top dead center, the axis of the disc and the axis of the crankshaft are co-linear, and no further rotational movement of the crankshaft with corresponding linear reciprocating movement of the piston(s) can occur, unless some means are provided for causing a relative rolling movement of the disc and a corresponding linear movement of the piston(s) whereby the co-linearity of the disc axis and crankshaft axis is disturbed.

Machines incorporating such means for causing relative rotational movement of the disc and corresponding linear movement of the pistons have been proposed, the said means being a peg, gear or gear train providing a resisting force on the disc parallel to, but offset from, the line of action of the force exerted from the piston so that at positions of concentricity of the disc and crankshaft, a moment is created by the action of the force exerted by the piston and the opposed resisting force exerted by the gear thereby causing the disc to rotate about the crankpin so that the disc and crankshaft are no longer coaxial. The resistance of the gear or gear train is provided by meshing with gearing provided on the crankcase or frame of the machine or by meshing with gearing on the crankshaft. The resistance manifests itself as a torque in the machine frame or crankcase or a counter-torque in the crankshaft. The gear which engages the disc must be outside the volume swept by the yoke to avoid fouling, and in consequence, the crankpin is axially lengthened to accommodate the additional axial length of the gear.

Although primary balance of this type of machine is obtainable by employing an array of pairs of cylinders which are symmetrical about the crankshaft axis, a major problem in machines of this type is to provide a satisfactory relationship between the crankpin throw, the crankpin diameter and the diameter of the discs if high performance is to be attained without unacceptable stressing of the dynamically stressed parts, and it is highly desirable to minimize, as far as possible, the crankpin diameter for a required bending stiffness: this desirable optimization can only be achieved by empolying the shortest possible crankpin.

Among the objects of the present invention are the mitigation of the foregoing disadvantages and a reduction in the cost of large-scale manufacture of such machines by avoiding the use of gear trains in the machines and to improve the overall efficiency of such machines.

Another object of the present invention is to provide an improved mechanical arrangement for the taking up of the side forces through the use of a wear shim mounted on the piston thereby permitting the design of maximum stiffness piston connecting yokes. The wear shim is preferably made of thin hard metal sufficiently flexible to allow a wedge of lubricant to form between the shim and cylinder walls as the piston reciprocates.

The present invention provides a machine (as hereinbefore defined) comprising a frame, a crankshaft rotatably mounted in the frame, at least one plurality of pairs of cylinders attached to the frame, the cylinders in each pair being disposed on opposite sides of the axis of the crankshaft and the pairs of cylinders being angularly and axially separated around the crankshaft axis, means for allowing fluid to pass into each cylinder at one pressure and for allowing fluid to pass out of each cylinder at another pressure, the crankshaft having one crankpin for the or each plurality of pairs of cylinders, the or each crankpin having an axis which is eccentric relative to the crankshaft axis, a plurality of discs equal in number to the number of pairs of cylinders and each disc being rotatably mounted on one of the crankpins between the cylinders of a respective cylinder pair with its geometric axis having an eccentricity relative to the crankpin axis equal to the eccentricity of the crankpin axis relative to the crankshaft axis, the geometric axes of the discs on the or each crankpin having a relative angular separation which is twice the relative angular separation of their respective cylinder pairs, adjacent discs being in contact with each other over areas bounded between their superimposed peripheries (as viewed in directions parallel to the crankshaft axis) and rigidly connected to each other within said areas whereby all the discs on a common crankpin rotate together, the periphery of each disc being adapted to take a bearing load, and each disc being received in a bearing apertures of a rigid yoke which extends perpendicularly to the crankshaft axis and symmetrically on both sides of the disc, there being in each cylinder a piston connected to an end of the respective yoke, the piston having a substantially fluid-tight seal with the respective cylinder, there being no gear or gear-train connection between any one of the discs and any part of the frame or the crankshaft.

Although rolling bearing elements may be located between the surfaces of the yokes and discs, and the surfaces of the discs and crankpin(s), it is preferred to employ plain bearings in order to minimize the overall dimensions and increase the stiffness of the machine.

The yokes and discs are preferbly formed from a light alloy, and there may be an insert of thin sheet resilient wear-resistant metal such as hardened and ground sheet steel strip tightly received around the aperture of each yoke to serve as a bearing. The thickness of the strip should be a very small proportion of the diameter of the bearing aperture of the yoke, e.g. for a 3-inch yoke bearing aperture, a bearing strip having a thickness of about 0.02 inch would be satisfactory. Methods of forming such bearing strip inserts in apertures for other purposes are described in British patent specifications 1,237,962 and 1,244,800.

Lubrication of the rubbing surfaces of the machines is preferably provided by oilways extending from the bearings of the crankshaft into the crankpin and radially to the surface of the crankpin. Oil distribution may further take place from the clearance between the crankpin and the eccentric radially outwardly through each disc to the rubbing surfaces of the discs and surrounding yokes. Since, during operation, the rubbing surfaces move in relatively opposite directions at substantially constant speeds (in contrast to the corresponding situation in machines employing connecting rods between a wrist pin bearing at the piston and a main bearing at the crankpin), lubrication between rubbing surfaces is effected under conditions which promote perfect dymanic film lubrication, thus minimizing wear between the rubbing surfaces.

The plurality of discs in each crankpin may be formed from a single piece of metal, and although the method by which such forming may be undertaken will be well known to those skilled in the art, machines of the invention may alternatively have at least two adjacent discs formed from respective discrete pieces of metal which are connected to each other by connecting members (such as threaded dowels) received in apertures in the said areas bounded by said superimposed peripheries: this latter construction may be preferred for machines where the disc diameters are relatively large — e.g. no smaller than 4 inches diameter, and preferably more than 6 inches diameter.

Although the crankpin may be formed unitarily with the crankshaft, it is preferred to employ a built-up crankpin/crankshaft construction in which the crankpin is accurately received at each of its ends in circular recesses in the crankshaft, there being an aperture through the crankpin and a co-linear aperture through the apertures of the crankshaft, the apertures being parallel to the crankshaft axis, and a longitudinal member extending through said apertures and engaging with the crankshaft on each side of the crankpin to maintain the crankpin in the circular recesses of crankshaft. The longitudinal member is preferably maintained in such tension in the crankshaft/crankpin assembly that the latter is maintained in axial compression during its working cycle so that bending stresses in the crankpin when the pistons and yokes are loaded by fluid and inertial forces are either eliminated or minimized, thus improving the smoothness of operation of the machine and increasing the potential life of the crankpin. It is preferred to employ a longitudinal member of low stiffness, and during assembly of the crankshaft/crankpin, the longitudinal member may be pre-tensioned before it is engaged with the crankshaft on each side of the crankpin.

In a preferred machine, each crankpin supports, through the discs thereon, a symmetrical array of pairs of cylinders (although no substantial disadvantage arises from the use of an asymmetrical array of pairs, and for particular applications, asymmetry may be preferred to obtain a desired overall engine shape), and typically there may be two pairs of cylinders disposed perpendicularly to each other about the crankshaft axis.

In the absence of gear trains between the discs and either the crankcase or frame, or the crankshaft, the crankpin is relatively short, and very stiff. Side loads generated in the machine are found to divide between the piston/cylinder pairs for all angular positions of the crankshaft, and they may be exerted directly between the pistons and the walls of their associated cylinders. In order to minimize the overall weight of the machine, and to minimize inertial forces, it is preferred to employ lightweight alloys for the pistons, yokes and cylinders, inter alia. Such lightweight alloys are not always very resistant to wear when they are employed in zones where adequate suitable lubrication at the working temperatures is not easy to guarantee. An obvious example of such a zone is the region between a light alloy piston and the rubbing surface of the cylinder, and to prevent piston-cylinder contact and to take up cylinder wear, each piston is provided with a hard metal strip retained in position around the periphery of the piston facing the cylinder wall, the strip serving to act as a bearing ring for any side loads on the piston. The strip is preferably of thin springy hard metal, and may be in the form of a split ring to permit very slight movements in the direction of side thrust. A suitable strip may be formed from tool steel such as ball bearing steel EN 31 and may be from 0.03 to 0.50 inch thick, preferably 0.040 to 0.045 inch thick for a piston of outside diameter exceeding 3 ⅓ inches. Methods of assembling such bearing rings or strips are described in British patent 874145.

In preferred embodiments of the invention, each cylinder has a single port for the entrance and exit of fluid, there being a fluid supply conduit and a fluid removal conduit which communicate with the single port through a valve member in the form of a hollow spool mounted for rotation about its axis with its axis substantially parallel to the crankshaft axis, the spool being open at both ends and having two circumferentially spaced apart ports in its side walls, there being a dividing wall extending between the periphery of one open end and the periphery of the other open end between the two ports thereby dividing the hollow interior into two non-communicating sections, but enabling fluid to pass through one open end and the port on one side of the dividing wall and to pass through the port and the other open end on the other side of the dividing wall, the spool being half received in first recessed bearing means on the cylinder head, and half enclosed in second recessed bearing means, the two bearing means being sealingly pivoted relative to each other on one side of the bearing surfaces and a resilient packing sealing the bearing means on the other side of the bearing surfaces, the spool being closely enclosed by the recessed bearing surfaces, there being means for holding the second recessed bearing means in sealing engagement against the first recessed bearing means and the pivot and the resilient packing, and means for coupling the hollow spool to the crankshaft whereby any rotation of the crankshaft causes a synchronized rotation of the hollow spool. Rotary valves of the type described above are described in British patent specifications 451,917, 481,933 and 504,709 and also described in the papers contributed by Roland C. Cross to the (British) Institution of Mechanical Engineers, and referred to in the Proceedings of the Automobile Engineering Division of the Institution of Mechanical Engineers 1957–58 in the Chairman's address.

A valve of this type provides excellent sealing under very heavy fluid pressure loading and is free from several problems associated with poppet valves — in particular cool fluid passing through one side of the valve prevents the other side of the valve from attaining the levels of temperature which, in internal combustion engines causes engine knock or fuel detonation with relatively low octane fuel; the port area may be relatively large in relation to the cylinder area (e.g. greater than 30%, 36% being a typical relative area as compared with a maximum of 25% for poppet valves), friction losses are low, there need be no overlap between inspiration and exhaust opening positions, and there is freedom from valve bounce. All of these features contribute towards ensuring that maximum power is generated from a fuel charge and that pollution from partially burned fuel is minimized. Moreover, the shape of the combustion chamber can be optimized to benefit power and combustion.

Such rotary valves can be accommodated with no difficulty in machines of the invention since the cylinders are angularly separated and the axial length of the valves presents no special difficulty, while the fact that the axes of all the valves of a machine will be parallel considerably simplifies the driving of the valves, and a toothed belt drive or counterweighted linkage system may be used to drive all of the valves in synchronism directly from the crankshaft.

An advantageous assembly of machine in accordance with this invention utilizes cylinders which are each exteriorly flanged between their inner (crankshaft) ends and their outer (valve-supporting) ends; the cylinder inwardly of the flange co-operating with a fluid-tight seal against the crankcase to prevent loss of crankcase lubricant when the cylinder inwardly of the flange is received in an aperture of the crankcase and the cylinder fastened to the crankcase. The means for holding the second recessed bearing means in sealing engagement with the first recessed bearing means may be a number of tensioned bolts or studs extending into the crankcase and serving also to maintain the flange of each cylinder close to, or against, the crankcase or frame.

The crankcase of the machine of the invention may support at least some bearings for the crankshaft and may be formed in a number of parts separable in the crankshaft-axial direction and equal in number to the number of pairs of cylinders, the crankcase parts being joined together along a line which intercepts apertures for the receipt of cylinders and is co-linear with the diameters of at least one pair of apertures. The mode of construction enables machine assembly to be facilitated when the yokes of each pair of pistons are formed in one piece, optionally with the pistons formed in one piece with the yokes. Th pistons may alternatively be formed separately from the yokes, and the pistons and yokes connected rigidly by metal connecting means which are stronger in tension than the material of the yoke and/or the pistons. Thus, if the yoke and pistons are of light alloy which has poor tensile strength but adequate compressive strength, the metal connecting means may be steel or titanium strip or steel studs or bolts, thus reducing the weight of the yoke/piston assembly.

The yoke may be formed in two parts which are separable about the disc receiving or surrounding aperture, and the said metal connecting means extend in tension at least across the line of juncture of the yoke parts: a crankcase construction differing from that hereinbefore described may be employed when the yokes are thus formed from separable parts.

The invention will now be described with reference to the accompanying drawings, in which:

FIG. 1 is a simplified diagrammatic side elevation of the piston-yoke-discs and crankshaft of a machine of the invention viewed in a direction parallel to the crankshaft axis;

FIG. 2 is a simplified diagrammatic side view of the machine of FIG. 1 looking in a direction perpendicular to the crankshaft axis;

Figure 3:
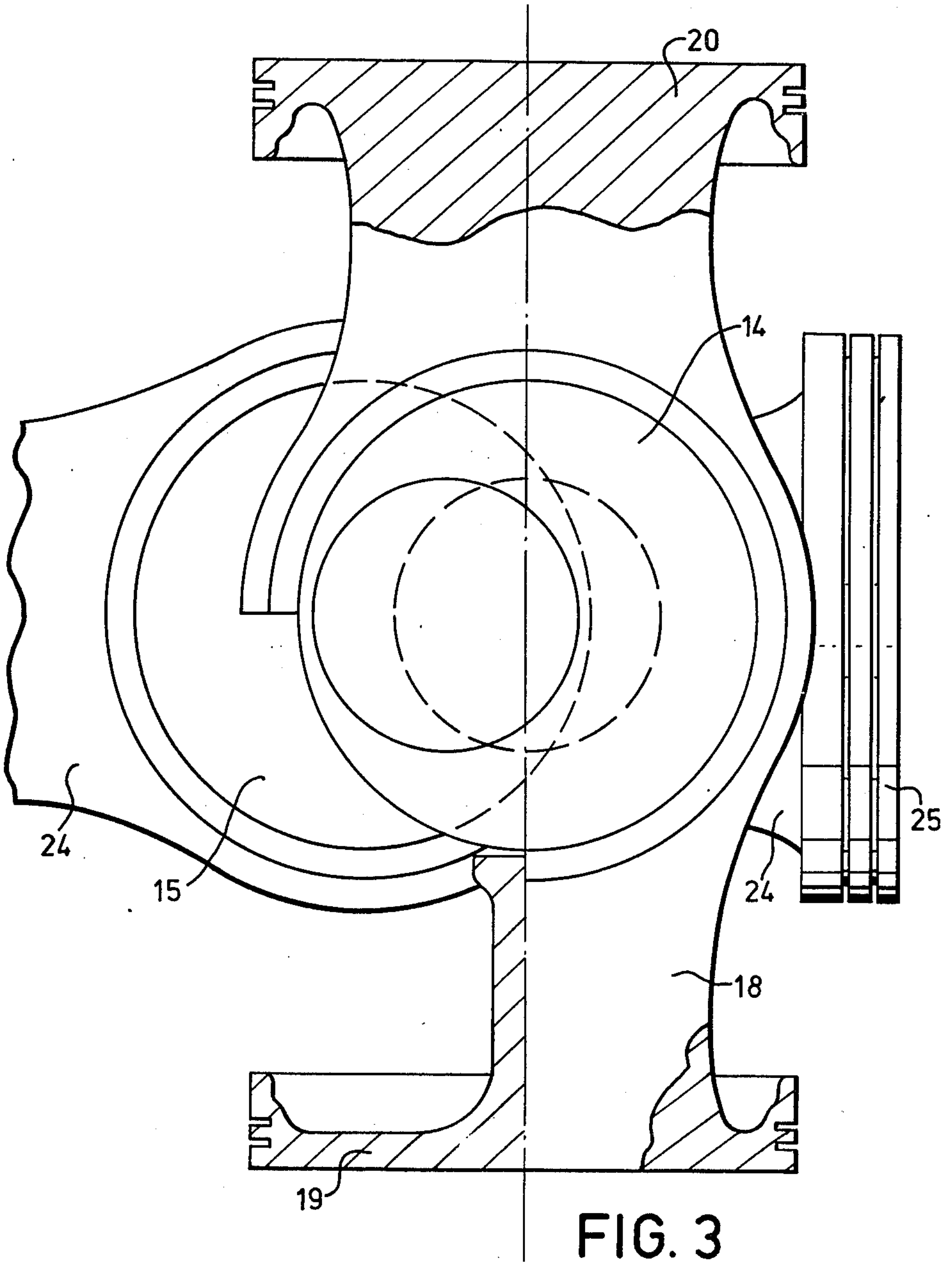
FIG. 3 is a diagram of the moving parts of FIG. 1 showing their approximate relative sizes.

Referring first to FIGS. 1 and 2 together, there is shown a crankshaft 10 having an eccentrically disposed crankpin 11 supported between balancing webs 12, 13. Around the crankpin 11 are disposed a pair of discs 14, 15 each having an eccentricity relative to the crankpin 11 equal to the eccentricity of the latter relative to the crankshaft 10. The discs 14 and 15 are integral with each other or joined together (either being formed from a single piece of metal or bolted, studded or doweled together) with the areas 16 bounded by their superimposed peripheries (as seen in FIG. 1) and are 180° out of phase with each other on the crankpin 11.

Disc 14 is closely received in an aperture 17 of a yoke 18 which extends on both sides of the disc 14, and at each end of the yoke 18 is diposed a piston 19, 20 which is integral with the yoke being formed in one piece therewith or rigidly attached thereto. Each piston 19, 20 is located in a respective cylinder 21, 22. In a similar fashion, the disc 15 is closely received in an aperture 23 in a yoke 24 extending on both sides of the disc 15 and having at each end integral pistons 25, 26 located in respective cylinders 27, 28.

The pairs of pistons 19, 20 and 25, 26 are 90° out of phase with each other, and it will be appreciated that if fluid pressure is exerted on the outer surface of piston 25, the resulting compressive force in yoke 24 will bear on the surface of disc 15 at the aperture 23 and also on the crankpin 11. As a result, the disc 15 and the crankpin 11 will move in the direction of the compressive force, the disc 15 moving in one rotary sense and the crankpin in the opposite sense to bring the axes of the disc 15 and the crankshaft 10 into co-linearity; the rotary movement of the crankpin 11 causes rotary movement of the crankshaft 10.

The rotary movement of the crankpin 11 communicates the motion of the piston pair 25, 26 to the piston pair 19, 20 by causing rotation of the eccentric disc 18, and one of the piston 19, 20 moves to top-dead-center (TDC) in its cylinder 27, 28 while the other pistons 25, 26 move to positions half way between TDC and bottom-dead-center (BDC), whereafter fluid pressure can be exerted on the piston at TDC to continue the rotary motion of the crankshaft 10.

It will be appreciated from the foregoing that the interaction of the discs and piston pairs so maintains their relative phasing that when one piston pair is at TDC and BDC while the other piston pair is at an intermediate position. Thus, no phasing gears are employed or required, and the tendency for the pistons to tilt is substantially eliminated due to the integrity of the pistons of each pair with each other through the substantially rigid connecting yoke. Moreover, side loads on the working piston are shared with the other pistons so that side-loads and wear in the cylinders is reduced. Due to the moments set up in each integral cluster of discs 14, 15, side forces are developed from gas forces only. Inertial forces cooperate within the cluster and eliminate inertial torque moments due to the radial phasing of the cylinders as described.

During operation, the rubbing speed between the eccentric discs 14, 15 and the crankpin 11 is virtually uniform and in one direction, and conditions between the discs 14, 15 and the crankpin 11 are ideal for film lubricating producing smooth operation and promoting reduced wear. Similar conditions prevail in the apertures 17, 23 so that film lubrication is easily provided between the yokes 18, 24 and the discs 14, 15.

It will be further appreciated that while the foregoing description relates to machines employing fluid pressure to rotate the crankshaft 10, the machine may be used to generate fluid pressure by rotation of the crankshaft 10.

Since the discs 14, 15 are as close together as is geometrically possible, the bending forces generated on the crankpin are distributed over a short crankpin length, and hence the crankpin may be relatively short in relation to its diameter. This latter feature is useful from the point of view of reducing the overall axial length of the engine as well as increasing the rigidity of the machine, since the bearings (not shown) for the crankshaft can be placed relatively close together. The disposition of the discs 14, 15 as close together as the machine geometry allows also provides advantages in reducing shear stress between the discs.

FIG. 3 shows the relative sizes of the crankshaft, crankpin, eccentric discs, yokes and pistons in a typical machine of this invention. One feature which is immediately apparent is that all parts of the machine which are stressed during use are short and stumpy, so that the machine as a whole and its parts are very rigid and strong. As depicted and described, all bearings between rubbing surfaces are plain bearings, and it is envisaged that plain bearings (as opposed to rolling element bearings) will be at least adequate and in most machines, advantageous and more than adequate for load bearing, since full film lubrication will be possible and the elimination of rolling element bearings reduces the diameter of the crankpin, and of the eccentric discs and the length of the yokes, thus further reducing the dimensions of the machines of the invention.

FIG. 4 to 9 depict various modes of connecting non-unitary pistons of the machines of the invention to their yokes when the pistons and yokes are formed from discrete pieces of metal.

Whe machines of the invention are to be used as internal combustion engines, the piston/yoke assembly must be capable of accommodating the following main conditions simultaneously within an allotted (and preferred) restricted space: (a) the dynamic bending moment from the central load is equally reacted as side thrust in the pistons, (b) the longitudinal inertial loading in the line of motion of each piston tends to throw the pistons off the yokes, (c) the hot strength of the pistons is reduced by thermal loading, (d) gas forces produce bending in the piston overhang, (e) the bearing clearances should be as uniform as possible for hot and cold conditions of operation, and (f) the overall width of the yoke and piston fastening relative to the width of the disc should be substantially constant to avoid fouling each adjacent yoke.

The constructions of FIGS. 4–9 are all capable of meeting the above criteria.

Figure 4:
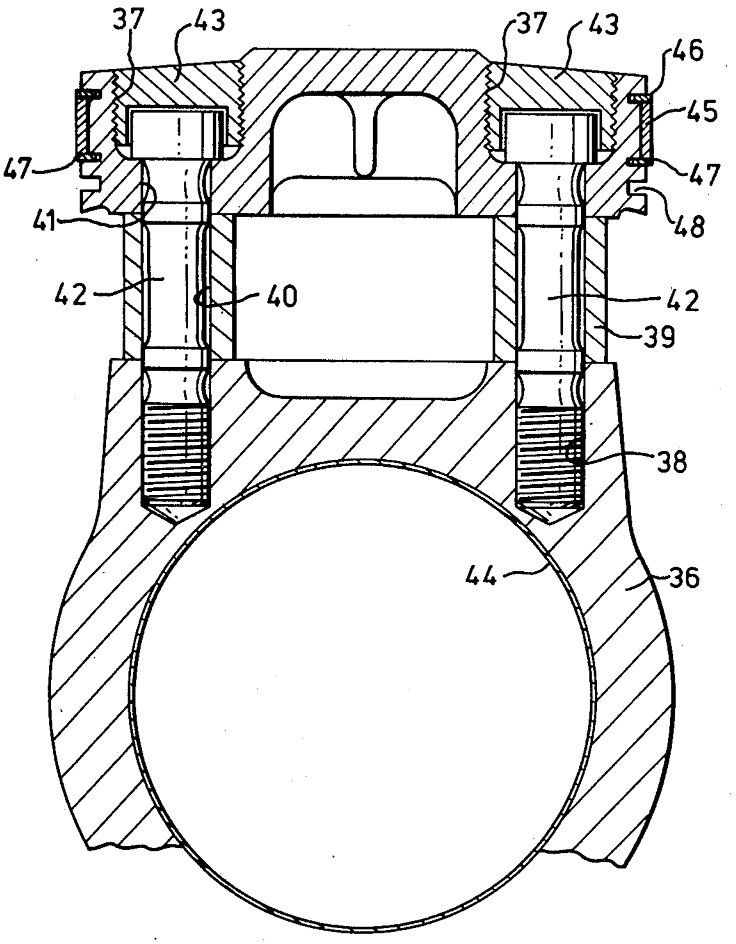
FIG. 4 is a cross-sectional view of one preferred type of piston-yoke assembly.

In FIG. 4, the piston 35 is of light alloy (a preferred alloy is one of the so-called R—R or Hiduminium R.R (Hiduminium is a registered trade mark) alloys comprising: 0.8–2.0% Cu, up to 4.0% Mg, 0.6–2.8% Si, 0.5–2.0% Ni, 0.6 to 1.5% Fe, 0.02 to 0.3% Ti and the balance aluminium), e.g R.R. 58, while the yoke 36 is also of light alloy, preferably R.R 58. The piston 35 is provided with a number of bores 37 near its periphery, and complementary internally threaded orifices 38 are provided in the yoke 36. A steel or titanium spacer 39 separates the top of the yoke from the underside of the piston 35 and the spacer has bores 40 therethrough which register with the orifices 38 and the orifices 41 beneath the orifices 37 of the piston. Studs or bolts 42 are inserted through the orifices 41, 40 and 38 and engaged with the internal threads of the latter to join the piston and yoke. The top of the stud 42 may be bolt-head or a nut. The bores 37 are closed with plugs 43 to form the piston crown when the studs 42 have been tensioned to the desired degree (e.g. 20 tons/in$^2$).

The bearing surface of the yoke 36 in which the corresponding disc is received is preferably formed in such manner that the disc may be formed of a light alloy. Since light alloys such as the R.R. alloys are relatively soft and abradable, it is preferred to avoid providing an outer bearing surface on the disc which is to move relative to the soft alloy of the yoke. Accordingly, a length of springy tool steel or shim of thickness of the order of 0.045 inch is accurately sprung into the internal disc-receiving aperture of the yoke 36, as indicated at 44: in this manner, thermal expansion or contraction of the disc is accommodated with almost no change in clearance in the bearing formed by the shim-strip 44 since most dimensional changes will be matched by corresponding dimensional variations in the yoke 36, the shim-strip 44 being too small to be of significant effect. The hard steel lines aperture in the yoke 36 forms almost a perfect bearing with the softer metal of the disc. It may be advantageous to diffuse a bearing-improving material, such as tin, into the outer surface of the disc.

It has previously been stated that in machines of this invention, the side loads are divided between the pistons and carried between the pistons and the cylinder walls. To effect this action without causing undue wear of the cylinders, the periphery of the piston is provided with a springy, hard steel shim 45 which stands out from the piston at all times. and is maintained in position around the piston against movement in the direction of piston reciprocation by springy steel inserts 46,

47 which are retained in recesses in the piston and which engage the lateral edges of the bearing shims 45. The shim 45 may be received in a shallow recess in the piston provided that at all times it stands out from the piston, and reciprocating movements are prevented by the steel inserts. This type of bearer construction is described in British patent 874145. The inserts 46 and 47 may be received in recesses permitting a limited amount of radial movement so that the inserts 46, 47 can serve as gas and oil sealing rings.

Recesses 48 for conventional piston rings (not shown) and oil-control rings (not shown) are also depicted in FIG. 4.

It should be noted that in applicant's machine, the side forces are reacted directly onto the cylinders from the pistons, or in preferred embodiments, from bearing shims 45 around the periphery of the piston. Bearing shims 45 are each formed from springy thin, hard metal, and when loaded, form a wear curve in which a wedge of lubricant is trapped under pressure between the bearing member and the cylinder wall thereby preventing metal asperity contact.

The oil-wedge forming property of the bearing member applies in both directions of movement of the piston with the wider (i.e. thicker) end of the oil wedge facing towards the direction of movement. In those portions of the working cycle wherein the hydrodynamic wedge effect is low (e.g., at low sliding speeds), the instantaneous wear-curve generated form of the bearing member is sufficiently parallel to the cylinder wall to generate an oil film under pressure by means of squeeze action, thereby maintaining separation of the bearing member and cylinder. This is a significant distinction of applicant's arrangement from the prior art side thrust bearing arrangements such as shown in U.S. Pat. No. 3,258,992 to Hittel wherein a conventional bearing bushing is in contact with a slender piston rod.

Figure 5:
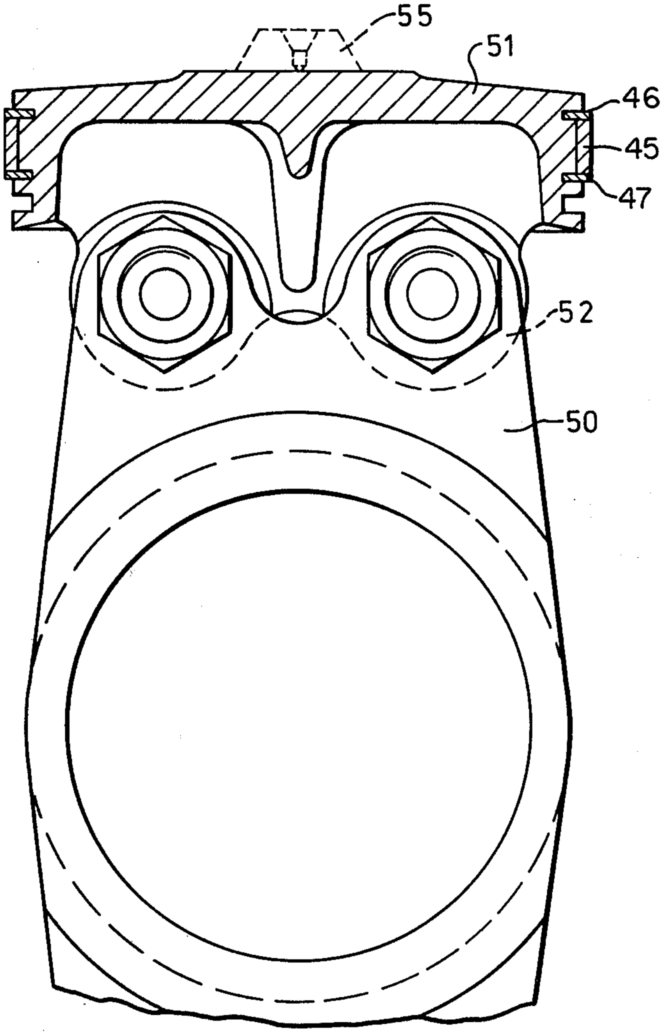
FIG. 5 is a view similar to FIG. 4, but of another type of piston-yoke assembly.
Figure 6:
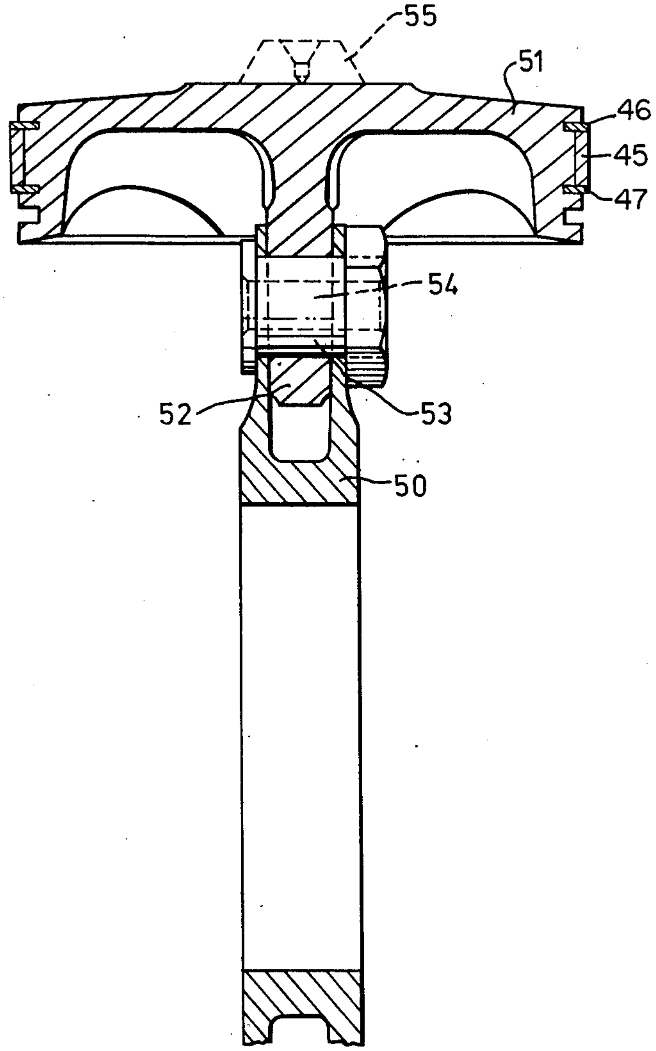
FIG. 6 is a cross-sectional view taken through the assembly of FIG. 5 perpendicular to the view of FIG. 5.

In FIGS. 5 and 6, a forked steel yoke 50 is attached to a turned light alloy piston 51 by sandwiching a central flange 52 between the prongs of the fork of the yoke, and bolting the prongs to the flange by studs 54 received in close interference fitting steel insert tubes 53 tightly engaging in registering apertures in the prongs and flange. The dotted central region 55 at the top of the piston 51 is a boss to facilitate the turning operation and is removed after turning.

Figure 7:
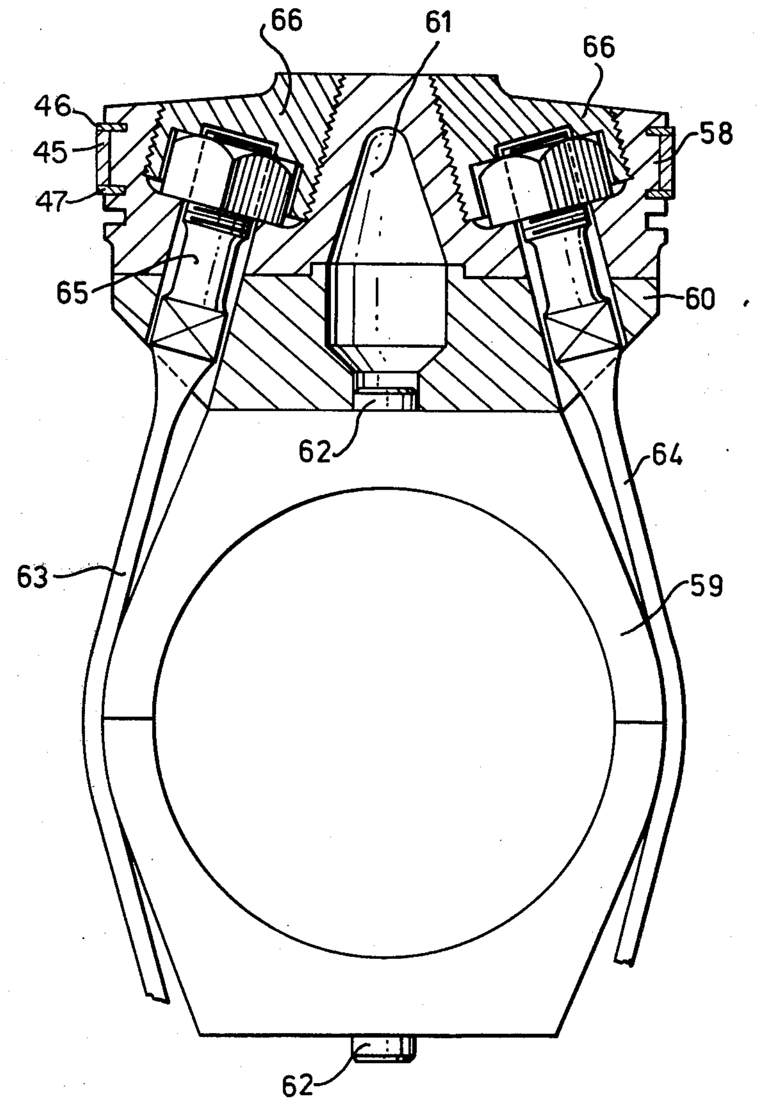
FIGS. 7, 8 and 9 are views each respectively similar to FIG. 4 showing other types of piston-yoke assembly.

In FIG. 7, the piston 58 and yoke 59 are both formed from light alloy (particularly the light, strong alloy known in the trade as Elektron (Registered trade mark) comprising 3–12% Al, 0.2–0.4% Mn, up to 3.5% Zn and the balance Mg), there being a titanium spacer 60 between the underside of the postion 58 and the yoke 59. To reduce weight, the interior of the piston 58 and the spacer 60 are hollowed as at 61, and the yoke is formed with locating pins 62 for receipt in the packer or spacer 60. The whole yoke/piston assembly is maintained in compression by forged steel straps 63, 64 extending around the edge-faces of the yoke 59 between the pistons 58 at each end. The straps are tensioned by nuts threaded on externally threaded bosses 65 at each end of each strap, the bosses 65 and nuts being received in sockets which, after the required tensioning of the piston/yoke assembly, are closed by plugs 66 which form part of the piston crown.

The yoke 59 may be machined as a single piece of metal or it may be formed in two halves as shown in FIG. 7 to facilitate assembly of the yoke and piston in some types of machine.

Figure 8:
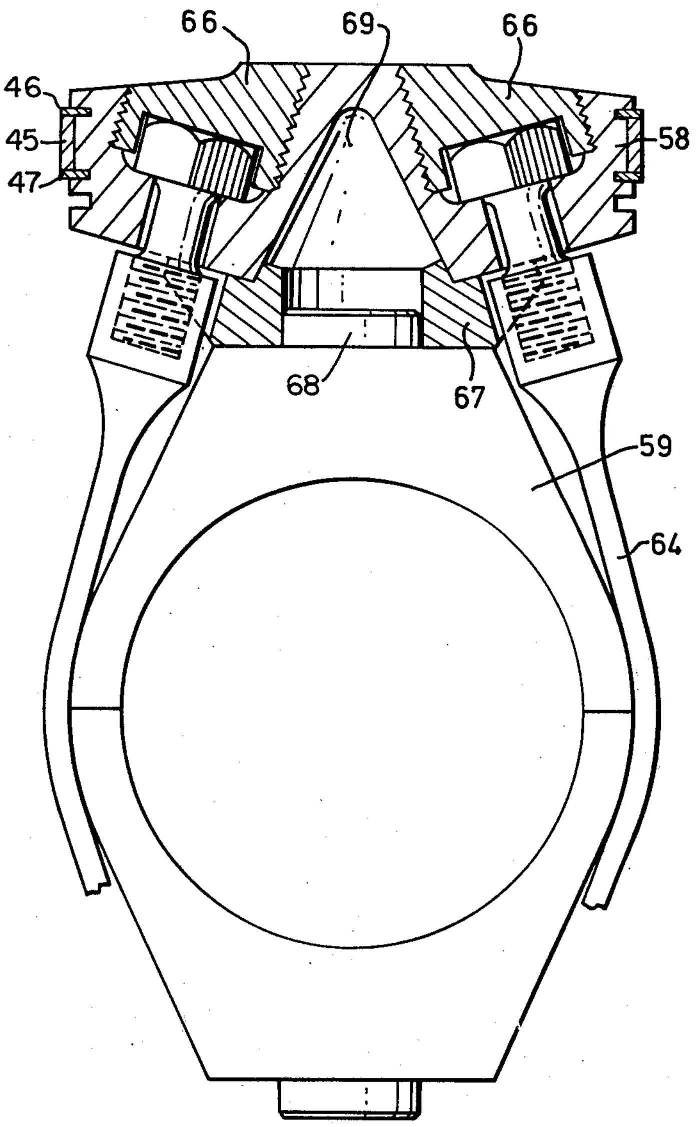

FIG. 8 is a variant of the assembly of FIG. 7 in which an annular steel packer 67 is located between a light alloy piston 58 and an Elektron (optionally split) yoke 59, the latter having an integrally formed locating pin 68 at each end which is received in the steel packer 67. The piston 58 is hollowed out, as indicated by reference 69 to reduce weight. The strap 64 is of titanium and has internally threaded bosses to receive bolts located in recesses in the piston, the piston crown being smoothly formed by virtue of plugs 66 located in the piston 58 above each bolt.

Figure 9:
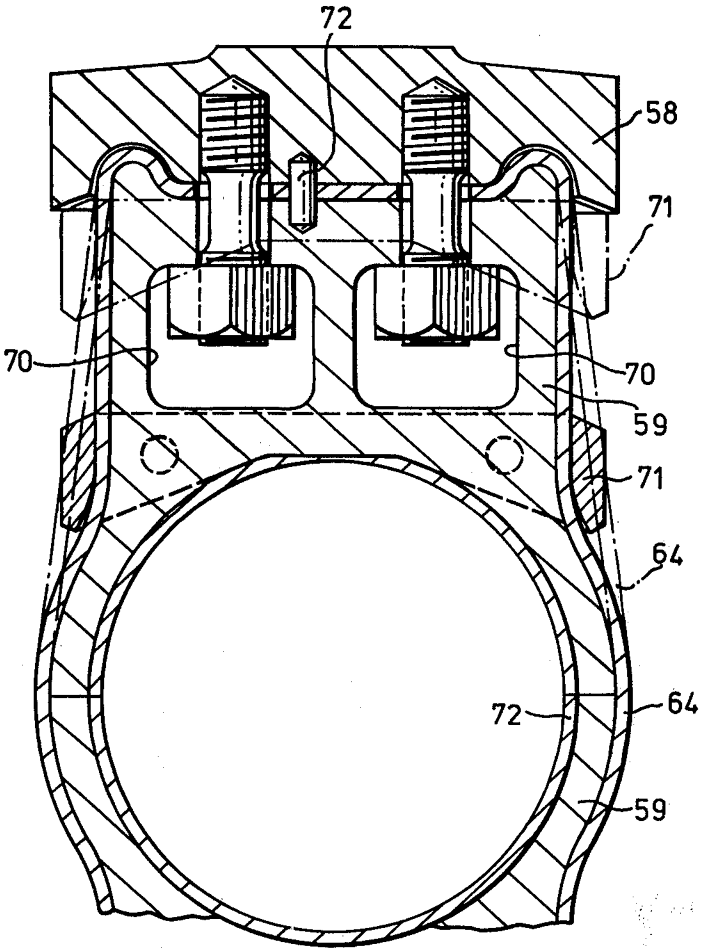

In the piston/yoke assembly of FIG. 9, a flat steel or titanium strap 64 is trapped between the underside of a light alloy (R.R 58 alloy) piston 58 and the yoke 59 by bolts accessible through spanner-holes 70 in the yoke, and the tension in the initially slack strap 64 (shown in broken lines) is increased to the desired degree by sliding a collar 71 from a position adjacent the piston (shown in broken lines) to a position (shown in solid lines) around the outwardly curving part of the yoke 59. A locating pin 172 in addition to the bolts ensures accurate positioning of the piston 58 on the yoke 59. The yoke 59 in FIG. 9 is splittable but has a springy tool steel shim 72 formed as an interference fit for the internal disc receiving bearing surface.

Figure 10:
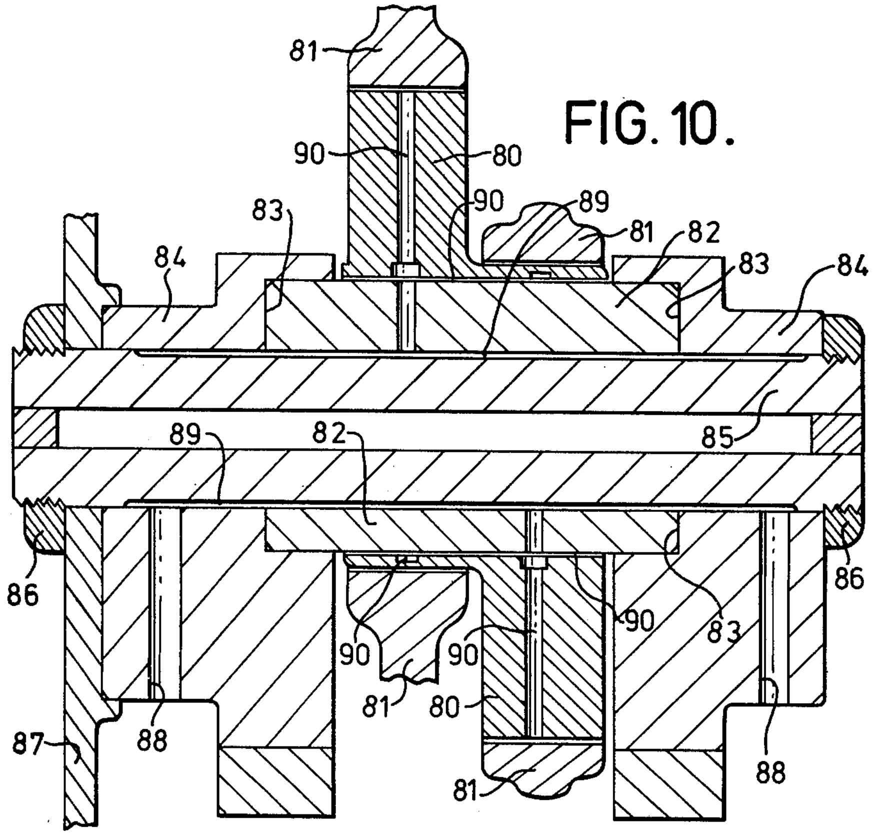
FIG. 10 is a cross-sectional view through a crankpin-crankshaft-disc assembly.

In th cross-section view of FIG. 10, the crankshaft and crankpin are a built-up assembly providing increased stiffness against oscillating tensile loads from the machine of the invention, and relatively short axial length. In FIG. 10, the integral discs 80 within their surrounding yokes 81 rotate on a crankpin 82 which is accurately received at each end in a circular blind bore 83 of a crankshaft member 84 which, as depicted, has its lower side heavier than its upper side to counterbalance the crankpin 82. The assembly is maintained integral of a hollow member 85 which extends through the interior of the crankpin 82 and the crankshaft end members 84 and is externally threaded at its protruding ends and maintained in tension by nuts 86 at each end. An attachment 87 to a flywheel is provided at the left hand end, as depicted. Lubricant is supplied via oilways in the crankshaft support bearings (not shown), from whence it passes via galleries 88 and oilways 89 to the bearing surface 90 of the crankpin 82. The discs 80 have one or more oilways on galleries 190 extending radially outwardly to the exterior bearing surfaces of the discs 80 from the interior aperture in which the crankpin 82 is received. Lubrication of the surfaces is comparatively easily effected in view of the short stroke of the pistons and the film lubrication that takes place during machine operation.

Figure 11:
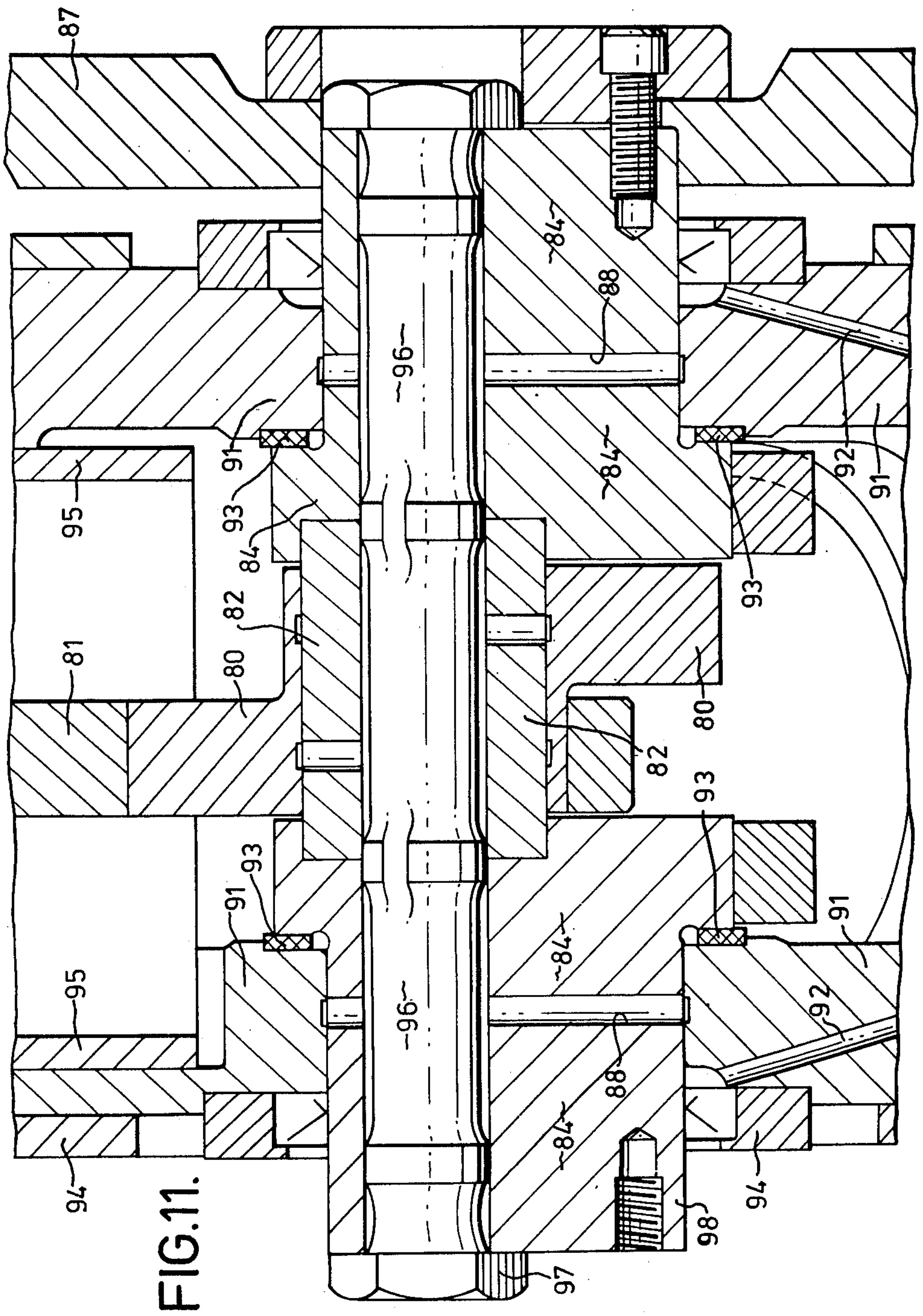
FIG. 11 is a view similar to that of FIG. 10 showing a modified form of crankpin.

In FIG. 11, the crankshaft/crankpin assembly is basically similar to that of FIG. 10, and corresponding parts have been given the same references. The flywheel part 87 is shown on the right hand side. In addition, there are shown the crankshaft bearings 91 with their oil galleries 92 and oil-seals 93 between stationary and moving parts. Among the stationary parts is shown the crankcase 94 and the inner walls 95 of the cylinder. The whole assembly is maintained integral by a straining bolt 96 formed from a material of low stiffness and which is pre-tensioned (e.g., hydraulically) before the retaining nut 97 is attached to maintain the tension, whereby the crankshaft/crankpin assembly in axial compression during the working cycle of the assembly. The protruding left hand end 198 of the crankshaft assembly can be employed as a drive take off for valves or belts.

Figure 12:
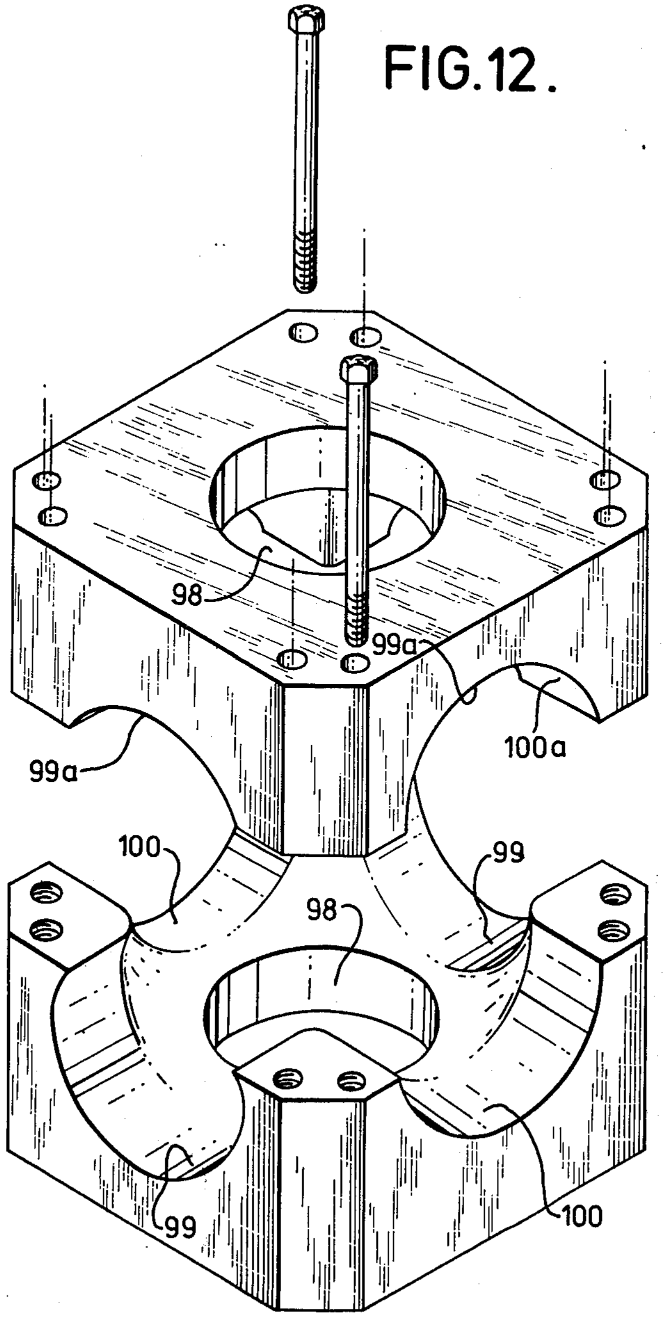
FIG. 12 shows one preferred type of crankcase.

In the crankcase of FIG. 12, there are two parts which separate symmetrically about a division plane. The crankshaft (not shown) may protrude into the apertures 98, and, as will be appreciated from the description of other diagrams (e.g. FIG. 10), the pairs of cylinders are separated axially along the crankshaft axis, and to accommodate this axial separation, one pair of apertures 99 is more deeply recessed into one crankcase part for the receipt of cylinders therein than the other pair of apertures 100. Similarly, the complementary recesses 99*a* are shallower in the other crankcase part than the ccomplementary recesses 100*a* for the other pair of cylinders. It will be appreciated that this compact type of crankcase can be employed for more than two pairs of cylinders. The two crankcase parts are bolted together for use, after the crankshaft/-crankpin, eccentric discs, yokes, cylinders and pistons have been suitably located inside. It is essential that the division plane between the crankcase parts is such as to split one of the pairs of cylinder apertures about their dimetrical chords.

Figure 13:
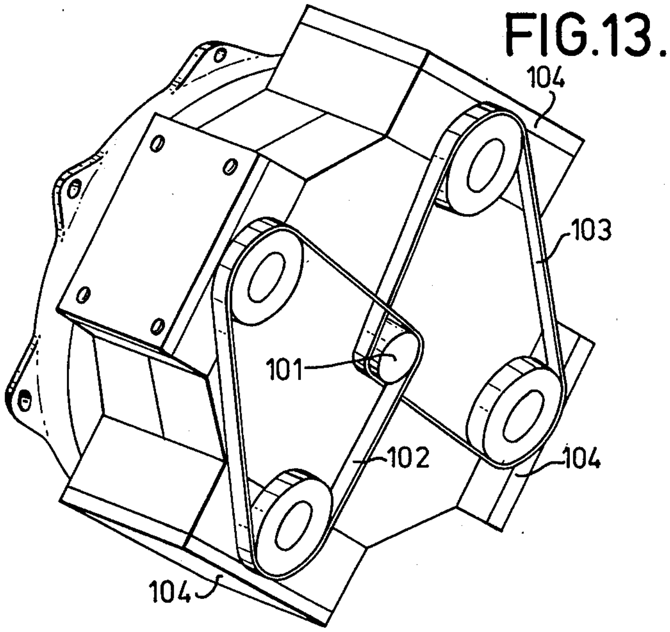
FIG. 13 is a simplified perspective external view of an assembled machine of the invention.

FIG. 13 shows a typical arrangement of assembled crankcase, with the crankshaft 101 protruding centrally from one end, and driving suitable belts 102, 103 for rotating the preferred rotary valves (not shown) located within the respective valve housings 104.

Figure 14:
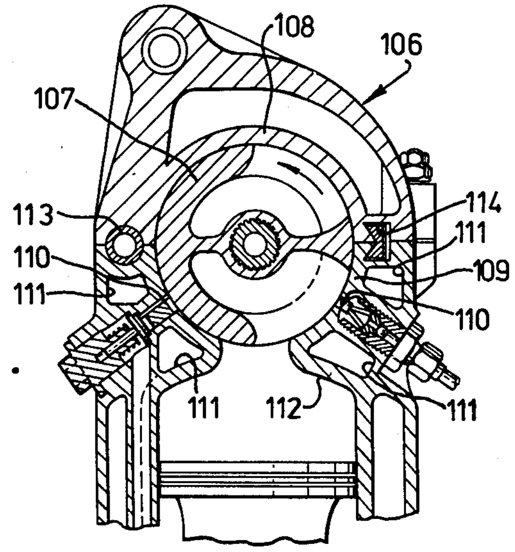
FIG. 14 is a cross-sectional view through a preferred type of valve.

The valve 106 of FIG. 14 comprises a hollow spool 107 mounted for rotation between an outer recessed housing 108 and an inner recessed housing 109, which housings 108, 109 have bearing surfaces for the outer walls of the spool. Oilways 110 for lubrication are provided as well as water coolant passages 111. As will later be seen, the construction and arrangement of the spool 107 is such that it is kept cool while serving to control the inlet and outlet of fluids to the cylinder inwardly of the valve 106. The inner housing 109 is integral with the cylinder head 112 while the outer housing 108 is sealed against the inner housing 109 on one side by a mutually recessed pivot 113 around which the outer housing can swing, and by a resilient sealing member 114 on the other side of the spool 107. The valve 107 is particularly suited for use in internal combustion engines, and during pressure fluctuations in the course of each 2- or 4-stroke cycle, the spool forms a dynamically lubricated fluid tight seal having a fluctuating seal zone position in the housings 108, 109. The actual seal zone at any instant depends on the gas pressure, the amount of anticlockwise (as viewed) pivoting about pivot 113 which can take place in the outer housing 108, and the pressure exerted on the outer housing 108 to resist the gas loading on the valve spool 107. The pressure exerted on the outer housing is variable by bolts or studs (not shown), while the amount of pivoting is determined by the resultant point of application of the pressure. By employing bolts or studs on each side of the valve 106 which exert their pressure through a connecting bridge (not shown) on the outer housing 108 at a pre-selected point (easily determined by trial), the sealing load can be reduced to a minimum while gas tight sealing and cool valve operation which permits low octane fuel operation is easily achieved.

Figure 15:
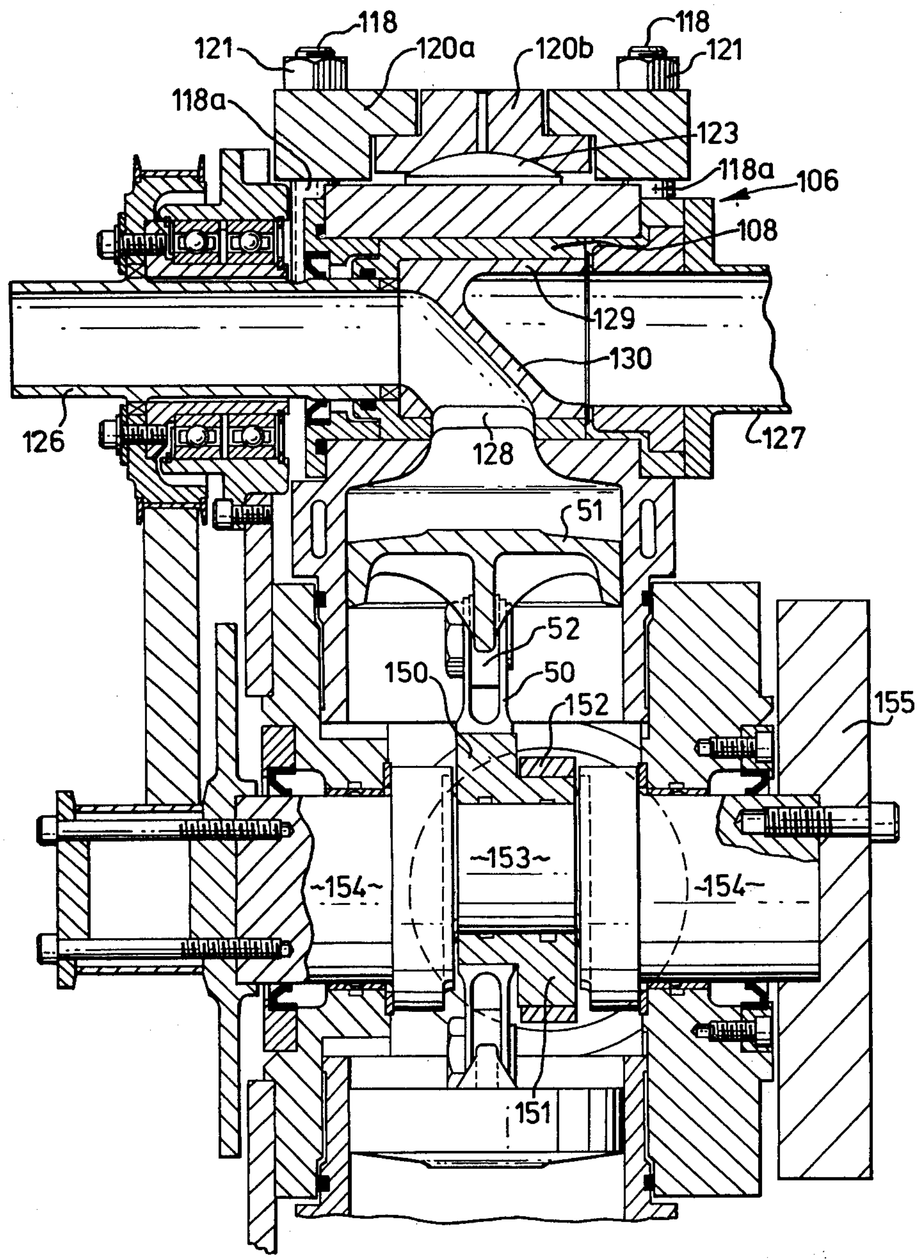
FIG. 15 is part-sectional elevation of an internal combustion engine in accordance with the invention, the elevation being in a cross-sectional plane perpendicular to that of FIG. 16.
Figure 16:
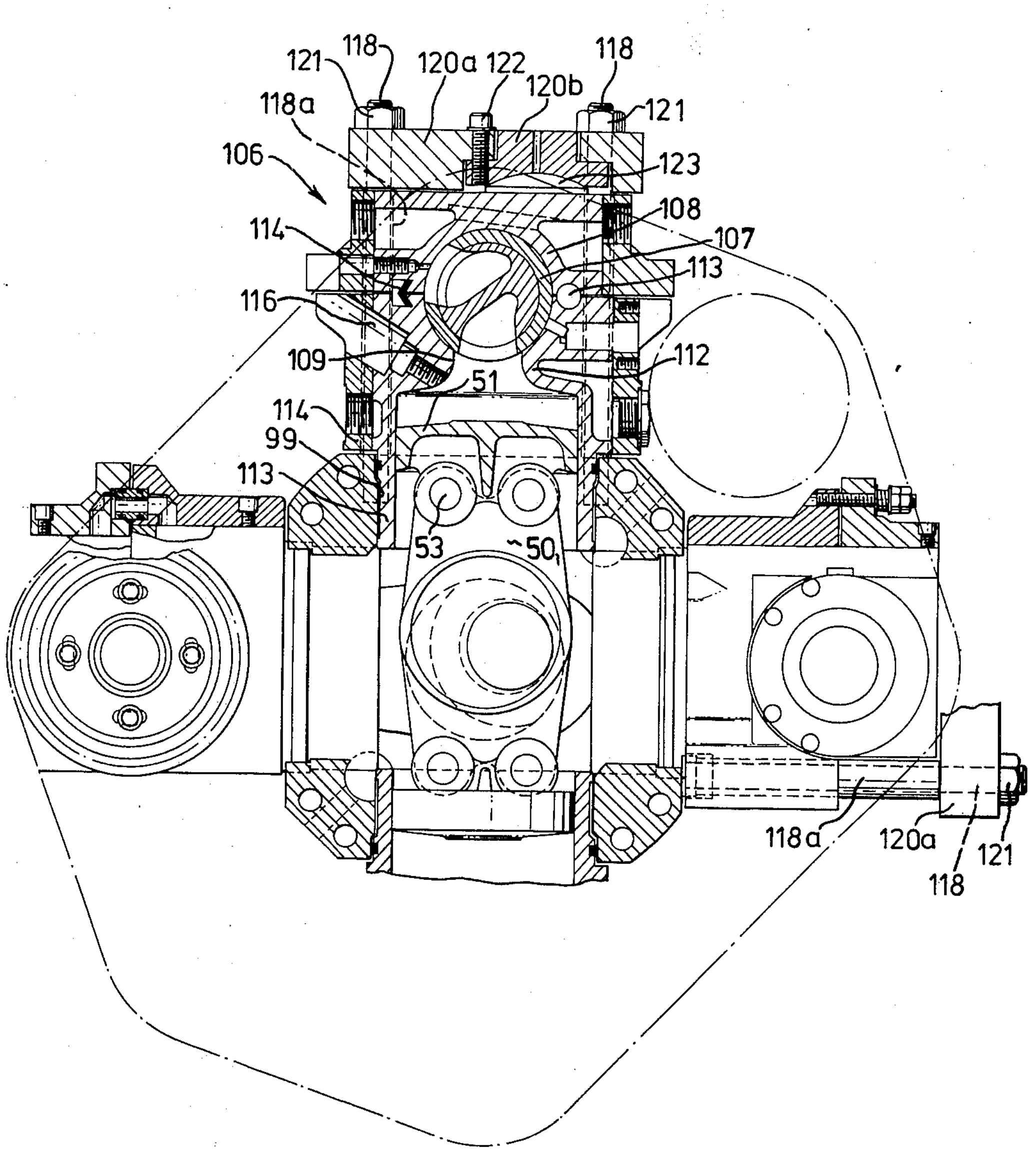
FIG. 16 is an elevation of the engine of FIG. 15 in a plane perpendicular to the crankshaft axis.

Reference is now made to FIGS. 15 and 16 showing an internal combustion engine in accordance with the invention and incorporating a valve 106 as described with reference to FIG. 14.

Referring to FIG. 16, the valve spool 107 is disposed beneath the outer or upper housing 108, the pivot 113 being to the right and the resilient packing 114 to the left. The lower housing 109 forms part of the cylinder head 112 and a spark-plug orifice 116 is formed therein. The cylinder head 112 is integral with th whole working cylinder 1113 which is provided on its outer face with a flange 1114 between the cylinder head and the innermost part of the cylinder 1113. The cylinder 1113 inwardly of the flange is received in a crankcase orifice 99 (as previously shown in FIG. 12) and is a slidable fit therein preferably with a lubricating steel bearing shim (not shown) between the exterior of the cylinder 113 and the aperture 99.

Between the flange 1114 and the opposed faces of the crankcase, a number of compression springs (not shown) received in apertures in the flange and crankcase faces tend to force the flange 1114 and the valve assembly away from the crankcase. The springs are maintained in compression by a number of studs 118 which are received at one end in threaded bores in the crankcase and which at the other end pass through respective apertures in a composite bridge member 120*a*, 120*b* and are secured against the bridge member by nuts 121. The bridge member is fixedly separated from the crankcase faces by hollow pillars 118*a* (only one being depicted in the bottom right-hand corner of FIG. 16) through which the studs 118 extend, the pillars 118*a* being trapped between the underside of the bridge member 120*a* and the opposed face of the crankcase. The length of the pillars is such that the springs are not fully compressed between the flange 1114 and the crankcase, so that the flange and the valve assembly and cylinder are free to move radially over limited distances.

The bridge piece 120*b* is movable within limits relative to bridge piece 120*a*, and has a part-spherical recess which cooperates with a pad 123. The bridge piece 120*b* is held in position by a number of screws 122 (only one is shown) passing through the bridge piece 120*a*. During operation, the gas pressure in the cylinder exerts a force against the whole area of the cylinder head 112, tending to force the cylinder head upwards (as depicted) against the pivot pin 113, the upper housing 108 and the pad 123. At the same time, the gas pressure force exerted on the valve spool 107 is determined by the smaller area of the port of the housing 109, and the spool 107 is also pressed upwards, but only against the upper housing 108. The tendency of the spool 107 to lift the outer housing 108 from the lower housing is resisted by the upward force on the cylinder head which reacts against the pad 123. The resultant pressure between the spool 107 and the outer housing is determined by the downward moment of the reaction at pad 123 about pin 113 and the upward moment of the forces on the spool 107 about pin 113. If the relative positions of the pad 123 and the pin 113 are suitably chosen, the force on the spool 107 can be adjusted to be just sufficient for gas-sealing. Thus power losses on the valve can be minimized and lubrication can be optimized.

In FIG. 15, it will be seen that the spool 107 is disposed between an inlet conduit 126 and an outlet conduit 127, there being a port 128 in the wall 129 of the spool 107 separated from another peripherally spaced port (not visible in FIG. 15) by a wall 130 extending between opposite ends of the spool and across the interior thereof. Thus as the spool is rotated, gases may pass into the cylinder through, say, port 128, and on further rotation, exhausted through the other port.

The drive for the spool is taken from the left hand end (as shown) of the crankshaft 154 via a belt 103 to a drive quill as shown diagrammatically in FIG. 13. Also shown in FIG. 15 are integral eccentric discs 150, 151, a sectioned part 152 of the yoke of the piston pair which reciprocate perpendicular to the plane of the paper, the crankpin 153 and the flywheel 155 secured to the crankshaft 154.

Although the piston/yoke assembly of FIGS. 5 and 6 is shown in FIGS. 15 and 16, it may be preferred to employ other types of assembly instead, e.g., that of FIG. 4, or any of those of FIGS. 7 to 9.

Figure 17:
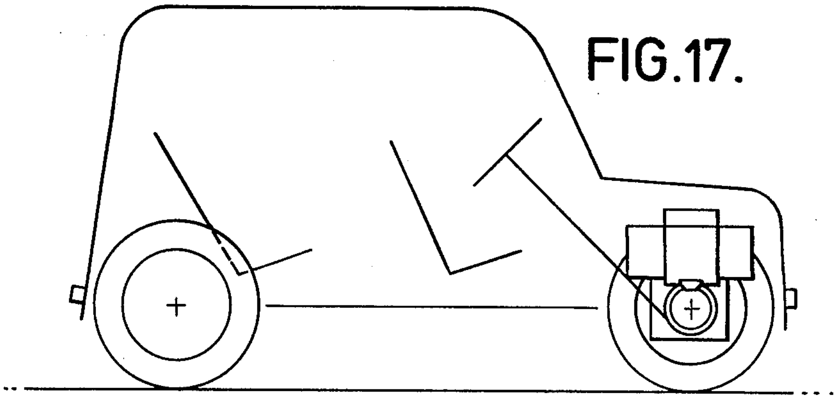
FIG. 17 shows an automobile having an engine in accordance with this invention located at the front.
Figure 18:
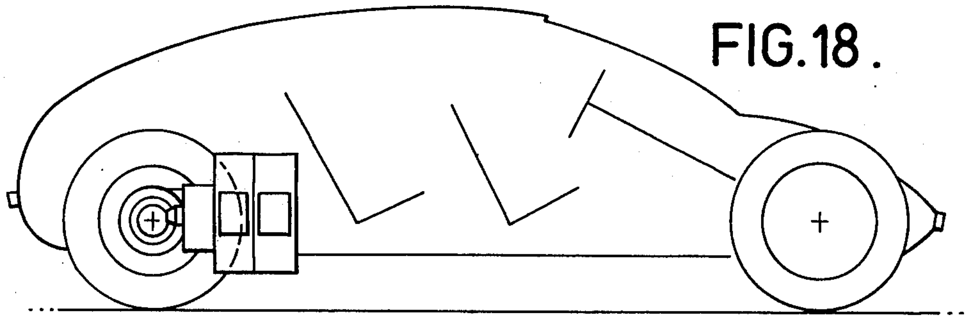
FIG. 18 shows an automobile having the engine disposed at a "mid-body" position.

FIGS. 17 and 18 show typical applications of the machines of this invention as power units for automobiles.

Using good, orthodox design methods, the machines of the invention can have 60% of the specific volume of and considerably greater stiffness and lower prime cost than their conventional counterparts. Thus, a 4-cylinder 1.5 liter high speed gasoline engine of 92.3 mm. bore and 56 mm. stroke will have a cylinder block which can easily be accommodated in a 240 mm. (9 ½ inch) square to which must be added only the height of the cylinder heads. The crankshaft length need not exceed 128 mm. (5 inch). The small dimensions of the engine lend themselves well for use in the most advantageous designs of vehicle (low bonnet line or mid-body location). If more than one bank of pairs of cylinders (e.g. 8 cylinders in two banks) is desired, any couple resulting from crankpins 180° out of phase is completely eliminated by mirror-imaging.

The advantages and benefits of machines of the invention are: (1) elimination of piston tilt and piston sealing problems; (2) reduction of number of stressed components; (3) elimination of secondary out-of-balance forces; (4) reduction in distance between crankshaft center-line and piston underside; (5) elimination of dynamic bending loads in the piston pairs; (6) increased crankshaft stiffness; (7) increased yoke stiffness in combination with optimized piston wear shim arrangement and lubrication to take up side thrust forces; and (8) lower manufacturing costs and reduction of specialized manufacturing processes. In addition, the improved combustion chamber shape combined with the rotary valve ensures unburned fuel pollutants, gas blow-by can be reduced by means of a blow-by belt, the pistons may be oil cooled, the shorter stiffer structure will minimize noise, and the tiltless pistons reduce oil consumption.

Although the machine of the invention has been described principally in its application to internal combustion engines, it will be clear to those skilled in the art that it may equally well be employed as a fluid pump or compressor, and in most other applications where a piston is conventionally connected to a crank by a connecting rod.

What is claimed is:

1. A machine comprising a frame, a crankshaft rotatably mounted in the frame, a plurality of pairs of cylinders integral with the frame, the cylinders in each pair being disposed on opposite sides of the axis of the crankshaft and each pair of cylinders being angularly and axially separated around the crankshaft axis, means for allowing fluid to pass into each cylinder at one pressure and for allowing fluid to pass out of each cylinder at another pressure, the crankshaft having one crankpin for each plurality of pairs of cylinders, each crankpin having an axis which is eccentric relative to the crankshaft axis, a plurality of discs equal in number to the number of pairs of cylinders and each disc being rotatably mounted on each crankpin between the cylinders of a respective cylinder pair with its geometric axis having an eccentricity relative to the crankpin axis equal to the eccentricity of the crankpin axis relative to the crankshaft axis, the geometric axis of the discs on each crankpin having a relative angular separation which is twice the relative angular separation of their respective cylinder pairs, adjacent discs being in contact with each other over areas bounded between their superimposed peripheries as viewed in directions parallel to the crankshaft axis and rigidly connected to each other within said areas whereby all the discs on a common crankpin rotate together, the periphery of each disc being adapted to take a bearing load, and each disc being received in a bearing aperture of a rigid yoke which extends perpendicularly to the crankshaft axis and symmetrically on both sides of the disc, there being in each cylinder a piston connected to each end of the yoke and the yoke being supported against side loads solely by cooperation of the piston with the cylinders at the ends of the yoke, the piston having a substantially fluid-tight seal with the respective cylinder and also includng a hard metal flexible bearing shim about the periphery of said piston and moving therewith, annular insert means engaging said piston disposed at opposite ends of said bearing shim to restrain axial movement of said shim on said piston, said bearing shim having an outside diameter larger than said piston and serving to act as essentailly the sole bearing member for adsorbing any side loads on the piston, by promoting the formation of a film of lubricant under pressure between the outer surface of the shim and the adjacent portion of the cylinder wall at relatively low piston speeds and forming said lubricant film to a wedge-shape (in axial cross section) with the wider end of the wedge facing the direction of movement of the piston at higher piston speeds, there being no gear or gear-train connection between any of the discs and any part of the frame or the crankshaft.

2. A machine according to claim 1 in which each disc is received in a plain bearing of the surrounding yoke.

3. A machine according to claim 1 in which each disc is formed from a light alloy and each yoke is formed from a light alloy, the plain bearing being an insert of thin sheet resilient metal of high wear resistance which is tightly received in a circular aperture of the yoke.

4. A machine according to claim 1 in which a plain bearing surface is provided between each crankpin and each disc.

5. A machine according to claim 1 in which each plurality of discs is formed from a single piece of metal.

6. A machine according to claim 1 in which there are provided two pairs of cylinders disposed perpendicularly to each other about the crankshaft axis on a common crankpin.

7. A machine according to claim 1 in which th yoke and pistons of each pair of pistons are formed in one piece.

8. A machine according to claim 1 adapted for the production of power by internal combustion in the cylinders, comprising means for supplying in turn to the cylinders the constituents of a conbustible air and fuel mixture, and means for leading combusted products out of the cylinders in turn.

9. A machine according to claim 1 comprising means for supplying a non-combustible pressurized fluid to the cyliners in turn, and means for leading fluid at a reduced pressure out of the cylinders in turn.

10. A machine according to claim 1 in which the crankpin is accurately received at each of its ends in circular apertures in the crankshaft, there being an aperture through the crankpin which is co-linear with an aperture through the crankshaft, the apertures being parallel to the crankshaft axis, and a longitudinal member extending through said apertures and engaging with the crankshaft on each side of the crankpin to maintan the crankpin in said circular recess in the crankshaft.

11. A machine according to claim 9 in which the longitudinal member is of low stiffness and is in tension whereby to maintain the crankshaft/crankpin is compression during at least part of the working cycle of the crankshaft.

12. A machine according to claim 10 in which the longitudinal member is pretensioned before it is engaged against the crankshaft on each side of the crankpin.

13. A machine according to claim 1 in which each cylinder has an exterior flange between its inner end and its outer end, the flange forming a fluid seal against sealing means on the frame when the cylinder inwardly of the flange is received in an aperture in the frame, and secured thereto.

14. A machine according to claim 13 in which the means for holding the second recessed bearing means in the said sealing engagement comprises a number of tensioned studs or bolts extending from the second recessed bearing means into the frame, said tensioned studs or bolts serving to maintain the flange of the respective cylinder in sealing disposition relative to the sealing means on the frame.

15. A machine according to claim 14 comprising a crankcase constituting at least some of the said frame, the crankcase surrounding the crankshaft and supporting at least in part some of the bearings for the crankshaft, the crankcase comprising a number of discrete crankcase parts equal to the number of pairs of pistons, the crankcase parts being joined together by joining means along a line which intersects apertures for the receipt of cylinders.

16. A machine according to claim 1 in which the pistons and yoke of each pair of pistons are formed separately and rigidly connected by metal connecting means which are stronger in tension than the material of at least one of the yoke and the pistons.

17. A machine according to claim 16 in which the yoke is formed in two parts which are separable about a separation line intersecting the aperture in which a respective disc is received, the said metal connecting means extending in tension at least on both sides of said separation line.

* * * * *